US009519301B2

(12) United States Patent
Bartlett et al.

(10) Patent No.: US 9,519,301 B2
(45) Date of Patent: Dec. 13, 2016

(54) CONTINGENCY-BASED LOAD SHEDDING

(71) Applicant: Schweitzer Engineering Laboratories, Inc., Pullman, WA (US)

(72) Inventors: Jedidiah W. Bartlett, Uniontown, WA (US); William F. Allen, Airdrie (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 294 days.

(21) Appl. No.: 14/190,858

(22) Filed: Feb. 26, 2014

(65) Prior Publication Data

US 2015/0241894 A1 Aug. 27, 2015

(51) Int. Cl.
*G06F 7/00* (2006.01)
*G05F 1/66* (2006.01)

(52) U.S. Cl.
CPC .................................... *G05F 1/66* (2013.01)

(58) Field of Classification Search
CPC .................................................. G06F 1/20
See application file for complete search history.

(56) References Cited

U.S. PATENT DOCUMENTS

| | | | | |
|---|---|---|---|---|
| 4,916,328 A * | 4/1990 | Culp, III | H02J 3/14 307/39 |
| 5,436,510 A | 7/1995 | Gilbert | |
| 6,204,642 B1 | 3/2001 | Lawson | |
| 6,608,635 B1 | 8/2003 | Mumm | |
| 7,698,233 B1 | 4/2010 | Edwards | |
| 8,131,383 B2 | 3/2012 | Pearson | |
| 8,604,803 B2 | 12/2013 | Dooley | |

(Continued)

FOREIGN PATENT DOCUMENTS

| | | |
|---|---|---|
| CN | 101545953 | 1/2011 |
| DE | 10200733 | 7/2003 |
| EP | 1381132 | 9/2010 |

OTHER PUBLICATIONS

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.*

(Continued)

*Primary Examiner* — Philip Wang
(74) *Attorney, Agent, or Firm* — Jared L. Cherry; Richard M. Edge

(57) ABSTRACT

Disclosed herein are a variety of systems and methods for management of an electric power generation and distribution system. According to various embodiments, a system consistent with the present disclosure may be configured to analyze a data set comprising a plurality of generator performance characteristics of a generator at a plurality of operating conditions. The performance characteristics may be used to produce a generator capability model. The generator capability model may comprise a mathematical representation approximating the generator performance characteristics at the plurality of operating conditions. The system may further produce an estimated generator capacity at a modeled condition that is distinct from the generator performance characteristics of the data set and is based upon the generator capability model and may implement a control action based on the estimated generator capacity at the modeled condition.

20 Claims, 14 Drawing Sheets

(56) References Cited

U.S. PATENT DOCUMENTS

| | | | | |
|---|---|---|---|---|
| 8,606,372 | B1 * | 12/2013 | Harris | H02J 3/00 700/20 |
| 2002/0091503 | A1 | 7/2002 | Carrillo | |
| 2003/0042876 | A1 | 3/2003 | Ikeda | |
| 2005/0285574 | A1 | 12/2005 | Huff | |
| 2007/0162189 | A1 | 7/2007 | Huff | |
| 2007/0168088 | A1 | 7/2007 | Ewing | |
| 2007/0219755 | A1 | 9/2007 | Williams | |
| 2007/0239372 | A1 * | 10/2007 | Schweitzer | H02J 3/14 702/57 |
| 2007/0239373 | A1 | 10/2007 | Nasle | |
| 2008/0074810 | A1 | 3/2008 | Guzman-Casillas | |
| 2010/0312414 | A1 | 12/2010 | Kumar | |
| 2011/0004425 | A1 | 1/2011 | Schweitzer | |
| 2011/0022245 | A1 | 1/2011 | Goodrum | |
| 2011/0054709 | A1 | 3/2011 | Son | |
| 2011/0320058 | A1 * | 12/2011 | Rietmann | H02J 3/006 700/297 |
| 2012/0123602 | A1 | 5/2012 | Sun | |
| 2012/0232710 | A1 | 9/2012 | Warner | |
| 2012/0310434 | A1 | 12/2012 | Taft | |
| 2013/0035885 | A1 | 2/2013 | Sharon | |
| 2013/0074513 | A1 | 3/2013 | Mueller | |
| 2013/0166085 | A1 | 6/2013 | Cherian | |
| 2014/0001847 | A1 * | 1/2014 | Khandelwal | H02J 3/14 307/11 |
| 2015/0244170 | A1 * | 8/2015 | Bartlett | H02J 4/00 700/287 |
| 2015/0244171 | A1 * | 8/2015 | Bartlett | H02J 4/00 307/29 |

OTHER PUBLICATIONS

PCT/US2015/014486 Patent Cooperation Treaty, International Search Report and Written Opinion of the International Searching Authority, May 14, 2015.

PCT/US2015/014487 Patent Cooperation Treaty, International Search Report and Written Opinion of the International Searching Authority, May 14, 2015.

PCT/US2015/014488 Patent Cooperation Treaty, International Search Report and Written Opinion of the International Searching Authority, May 14, 2015.

Kai Sun, Da-Zhong Zheng and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

* cited by examiner

CONTINGENCY-BASED LOAD SHEDDING

TECHNICAL FIELD

This disclosure relates to systems and methods for management of a power system. More particularly, but not exclusively, this disclosure relates to techniques prioritizing load shedding, detecting conditions in which load shedding is appropriate, determining topology, and estimating capabilities of electrical sources.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1A:
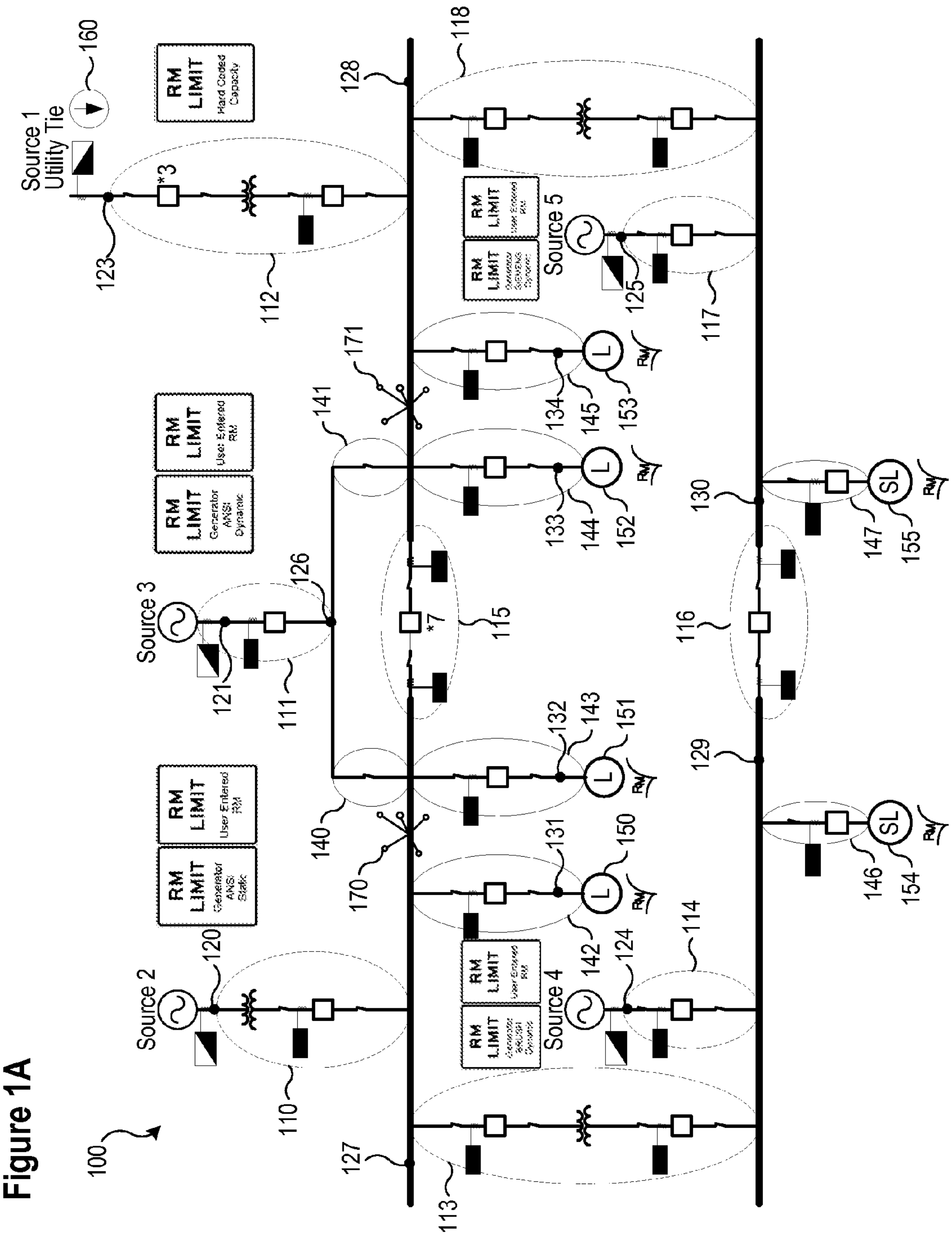
FIG. 1A illustrates a one line diagram of an electrical power distribution system consistent with embodiments of the present disclosure.

Management of an electric power distribution system may include balancing electrical power generation with fluctuating load demands. When the demands of the loads exceed the ability of sources in the system to supply electrical power, disruptions may occur. Disclosed herein are various embodiments of systems and methods for managing an electric power generation and distribution system that may be used in balancing electrical generation with electrical loads, determining the topology of an electrical power generation and distribution system, shedding loads upon the occurrence of contingencies, and/or modeling the capacity of electrical sources to improve efficiency of the system.

Various embodiments consistent with the present disclosure may utilize contingency-based load shedding schemes with priority lists to address shortfalls in generation capacity. Such schemes may monitor state information of a power system and react to changes in the interconnection between different nodes on the system. According to one specific embodiment, the state of devices in the system that can connect or isolate electrical nodes on the system may be monitored, together with devices that are configured to separate electrical sources from distribution busses.

Certain embodiments consistent with the present disclosure may rely on contingency detection algorithms, as described in greater detail below, to detect topology changes in an electric power generation and distribution system. The contingency detection algorithm may rely on multiple indications of a topology change that trigger a load-shedding event prior to shedding one or more loads. Upon the detection of one or more specific events, as described in greater detail below, one or more loads may be shed to maintain a generator/load balance and stability of the power generation and distribution system.

In one specific embodiment, the contingency detection algorithm may monitor four variables in assessing a load-shedding scenario. The first variable may be whether a particular contingency is armed. Whether a contingency is armed may depend on a variety of factors, such as: detecting a significant power-flow through a portion of an electric power generation and distribution system specified by the contingency, detecting that breakers and disconnects associated with the contingency indicate a conducting state, determining that no contingency triggers are present, and determining that communication channels to all of these indications are functional. The second variable may be based on the status of the electrical couplers associated with a particular topology link. The third variable may be the occurrence of a topology contingency trigger. Finally, the fourth variable may be a change in the interconnection of generators and loads in the electric power generation and distribution system. In certain embodiments, the first, second, and third variables may be associated with a specific contingency and/or associated with a particular topology link, while the fourth variable may be assessed across an electric power generation and distribution system.

The topology of an electric power distribution system may be monitored and utilized in connection with various contingency detection algorithms. Certain embodiments may rely on graph theory, and may determine which nodes in the electric power generation and distribution system are connected to one another. For example, various methods according to the present disclosure may determine which nodes can or cannot be reached from a given node, and/or may determine the number of different isolated segments that exist containing more than a single node.

Still further embodiments consistent with the present disclosure may utilize generator capability models configured to estimate parameters related to the capability of one or more generators. In certain embodiments, a generator capability model may be associated with a generator capability curve comprising a graphical illustration of a capability of a generator to continuously provide real and reactive power. Real power is typically plotted on the horizontal axis and reactive power is typically plotted on the vertical axis. Generator capability curves are typically dictated by physical parameters of a generator and the conditions in which the generator operates.

A generator capability curve may shrink and grow depending on the cooling capacity provided by the generator cooling system. In certain embodiments, a generator cooling system may utilize Hydrogen gas to saturate an air-gap of a generator and to cool the windings. The effectiveness of the cooling system may be affected by the pressure of hydrogen in the air-gap.

Generator manufacturers commonly publish the capability of a generator at different cooling gas temperatures (e.g., temperatures of the air used to cool the Hydrogen gas that saturates the air-gap of the generator) and/or different cooling gas pressures. Information provided by generator manufacturers commonly includes three different temperatures/pressures and the power output, as a function of power factor, of the generator operating at the specific temperatures/pressures based on empirical measurements. An operator of a generator may measure the temperature and/or pressure of the cooling gas and use the measured cooling gas temperature and/or pressure as a derate variable. The capability of the generator may be looked up using the information provided by the generator manufacturer. If, however, the value given to derate the generator (e.g., the temperature of the cooling gas, the pressure of the cooling gas) is outside a particular range and/or is at a different temperature than is provided by a manufacturer, there may be uncertainty as to the generator capacity.

According to various embodiments of the present disclosure, a generator capability model that relies on certain assumptions, which are described in greater detail below, may be created and used to estimate a generator capacity at a variety of temperatures, pressures, or other conditions. Moreover, the generator capability model may further be used to estimate other parameters, such as a reserve margin of a generator operating under specified conditions and/or a maneuvering margin, including both real and reactive components. According to some embodiments, the information provided by the generator manufacturer may be used in order to bound the permissible operating region of the generator. Information regarding generator capability may be used in connection with control decisions, such as load shedding, generation capacity, and the like.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus, and/or a wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic and/or processor executable instructions.

Figure 1B:
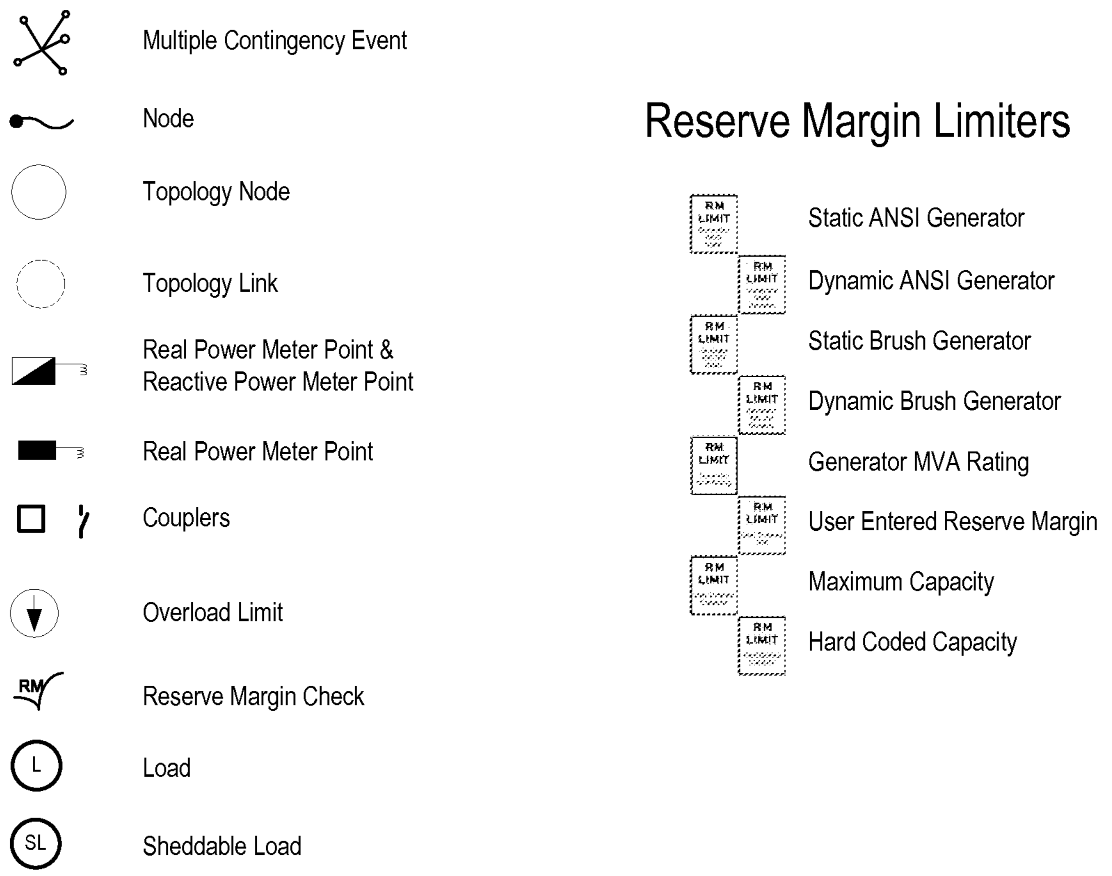
FIG. 1B illustrates a legend of the symbols shown in FIG. 1A.

FIG. 1A illustrates a one line diagram of an electrical power distribution system 100 consistent with embodiments of the present disclosure. FIG. 1B illustrates a legend of the symbols shown in FIG. 1A. System 100 may be configured to detect and respond to changes in the interconnection between different nodes and prioritize the shedding of loads in order to maintain system stability.

System 100 includes a plurality of sources, which are designated as Source 1 through Source 5. In some embodiments, one or more of Sources 1-5 may comprise one or more generator systems. As illustrated in FIG. 1A, a connection to a utility system may comprise a source (e.g., Source 1). Each of Sources 1-5 may be associated with a one or more characteristics (e.g., a reserve margin, an MVA Rating, etc.) that may be used to estimate additional power (either real or reactive) that each generator is able to provide to stabilize system 100 before load-shedding must occur.

A plurality of real power meters and real and reactive power meters may be disposed throughout system 100 in order to monitor power flow through system 100. Data collected by the plurality of power meters may be used in analyzing the flow of power and detecting events precipitating control actions (e.g., changes in topology, shedding loads, increasing generation capacity, etc.)

System 100 includes a plurality of nodes 120-134 and a plurality of topology links 110-118. A topology link, as the term is used herein, may comprise any suitable connection between two or more nodes in system 100 when all of the couplers in the topology link are in the conducting state. As illustrated in FIG. 1B, couplers are designated using switch symbols and/or white boxes. System 100 further includes a plurality of topology nodes 140-147. A topology node, as the term is used herein, may comprise a node where power-flow can diverge to multiple paths, but which does not connect two or more nodes.

Electrical power from Sources 1-5 may be provided to loads 150-155. According to various embodiments, loads 150-155 may be associated with a priority in connection with a load-shedding scheme. According to the illustrated embodiments, loads 154 and 155 are designated as sheddable loads. Certain loads may be designated as sheddable loads in the event that demand in system 100 exceeds the collective generation capacity of Sources 1-5. According to some embodiments, an operator of system 100 may select which loads and/or group of loads are to be shed and in which order such loads are to be shed.

According to certain embodiments, a control system (not shown) monitoring system 100 may be configured to perform a reserve margin check at one or more nodes 120-134. A reserve margin check may determine whether a minimum available reserve margin threshold is available, and if not, an output may be asserted. A variety of reserve margin check symbols are indicated in FIG. 1A at points in system 100 at which a reserve margin check may be performed. Moreover, certain embodiments may permit a user to specify an integrating overload limit for one or more sources, which will trigger a load shedding event if the source runs over a user-specified limit for too long. As illustrated in FIG. 1A, an overload limit 160 is specified for Source 1. Overload limits, reserve margin checks, and other criteria may be specified by an operator of system 100 as contingency triggers. Such contingency triggers, which may also be coupled with other conditions according to various embodiments, may be evaluated in connection with control actions relating to maintaining the stability of system 100.

According to one embodiment, system 100 may determine an overall system topology. In some embodiments, monitoring of system topology may include determining which sources are associated with which nodes in system 100. State changes may be characterized by changes in the topology that relate to specified interconnection points. Confirmation of state changes may be identified by multiple sources. Independent confirmation may place system 100 into an armed condition. The armed condition may allow sufficient time for evaluation of load-shedding to maintain the stability of system 100. Combinations of contingencies may be specified, according to certain embodiments, to address a variety of conditions that may occur on system 100.

System 100 further illustrates multiple contingency triggers 170 and 171, which may allow for multiple contingencies to be triggered at the same time. Multiple contingency triggers may be useful in the event of a bus-fault, for example, to reduce the likelihood of a miscalculation in a load-shedding algorithm based on asynchronous opening of the breakers on the bus. A multiple contingency trigger may, according to the illustrated embodiment, allow a control system to make load shedding decision by locking out the bus, thus allowing the load-shedding determination to be made based on what the final configuration of the system will be after the bus is clear. When a multiple contingency trigger 170, 171 is detected, a control system may determine which of the associated contingencies are connected to the specified node and are armed. The system may then wait for one of the contingencies in the list to be triggered. As soon as a first contingency specified in the multiple contingency trigger 170, 171 is triggered, all other contingencies may also be triggered.

According to various embodiment, any of the contingencies, pre-emptive bus-fault algorithms, sheddable loads, reserve margin checks, or integrating overloads may be individually disabled and/or enabled by an operator. The change of state of any of the implemented binary inputs, critical binary state information, and outputs may be logged. When a load-shedding decision is triggered (even if no loads are shed), an event report may be generated.

Figure 2:
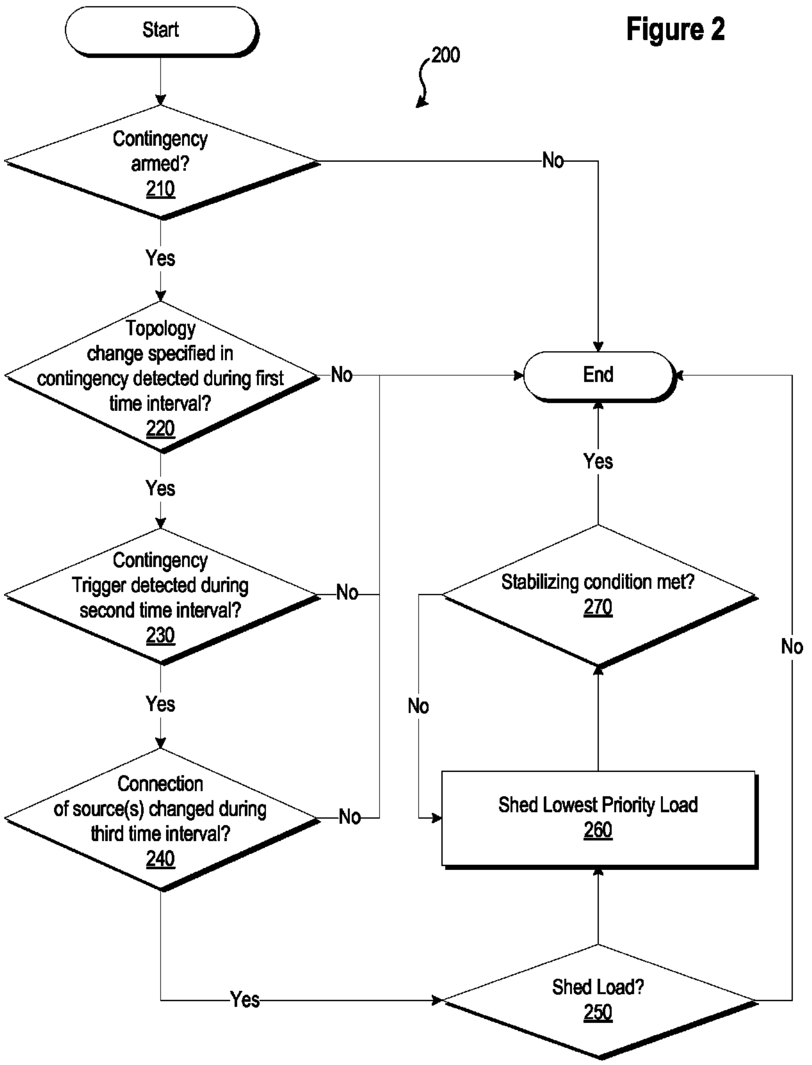
FIG. 2 illustrates a flow chart of a method for detecting conditions in which load shedding is appropriate consistent with embodiments of the present disclosure.

FIG. 2 illustrates a flow chart of a method 200 for detecting conditions in which load shedding is appropriate consistent with embodiments of the present disclosure. At 210, it may be determined whether a contingency is armed. As discussed above, various contingencies may be specified based upon a plurality of parameters (e.g., a reserve margin, an overload limit, etc.). At 220, method 200 may determine whether one or more sources changed during a first time interval. The first time interval may be a user-entered value. The first time interval may be set to a value sufficient to take into account delays between the various breaker states, contingency triggers, and communication asymmetries due to separate communication paths of the various monitored values. If the sources have not changed, method 200 may end. At 230, it may be determined whether a topology change associated with the contingency has occurred during a second time interval. Various systems and methods for detecting topology changes are described below in connection with FIG. 3 and FIG. 4.

At 240, a system implementing method 200 may determine whether a contingency trigger is detected during a third time interval. The contingency trigger may be met, for example, by a reserve margin falling below a specified threshold. In another example, the contingency trigger may be met by a current flow exceeding an overload limit.

At 250, the conditions in which load shedding may be appropriate have been detected. Accordingly, at 250, a load shedding assessment may be made. If load shedding is appropriate, the lowest priority load may be shed at 260. Method 200 may continue to shed the lowest priority load until a stabilizing condition is met at 270. The stabilizing condition may, according to some embodiments, be related to the he lowest priority load may be related to the contingency. For example, where the contingency is an overload condition, the stabilizing condition may be satisfied when the current flow falls below the overload condition.

Figure 3A:
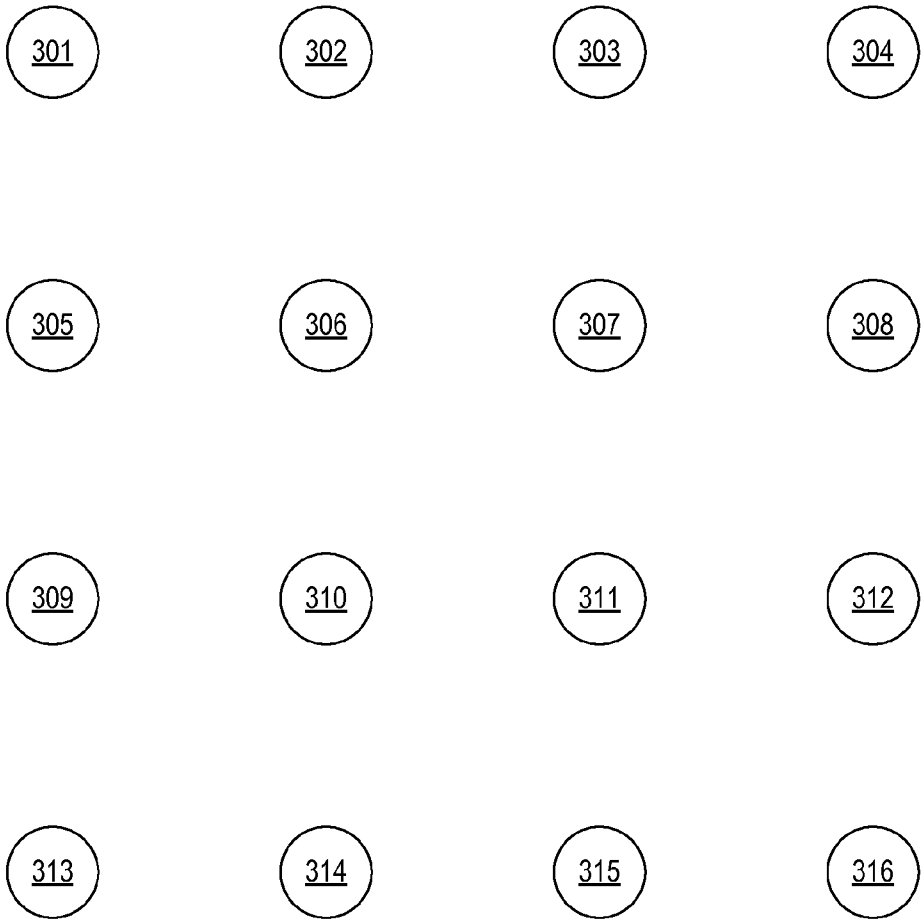
FIG. 3A illustrates a conceptual representation of a plurality of nodes in an electric power distribution system consistent with embodiments of the present disclosure.
Figure 3B:
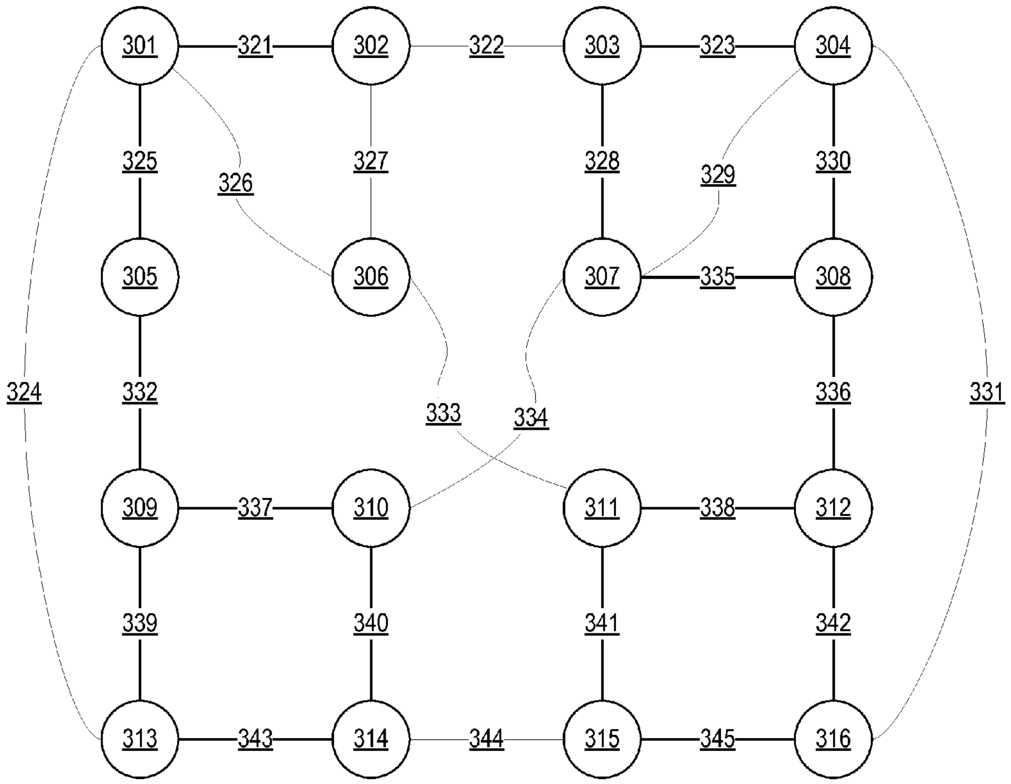
FIG. 3B illustrates a plurality of interconnections among the plurality of nodes illustrated in FIG. 3A.

FIG. 3A illustrates a conceptual representation of a plurality of nodes 301-316 in an electric power distribution system consistent with embodiments of the present disclosure. FIG. 3B illustrates a plurality of interconnections among the plurality of nodes 300 illustrated in FIG. 3A. The interconnections may represent transmission lines or other physical connections between nodes in an electric generation and distribution system. In operation, connections between nodes 301-316 may not necessarily all be active.

Figure 3C:
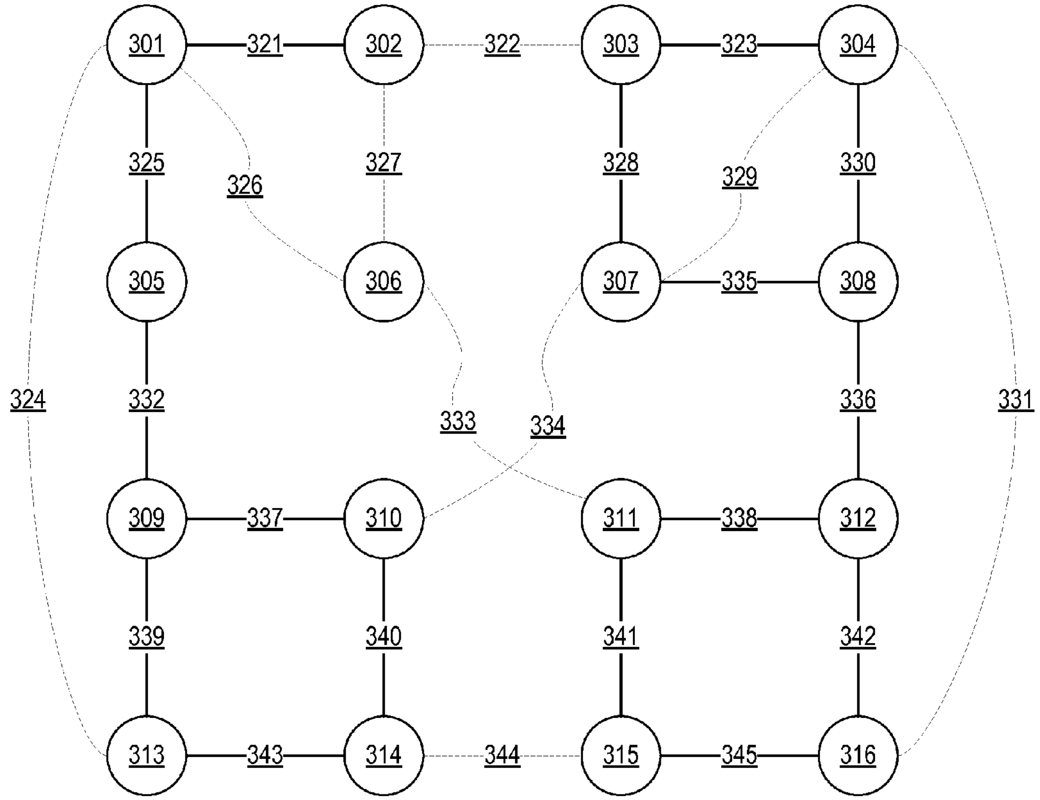
FIG. 3C illustrates a network graph showing a plurality of islands among the plurality of nodes and interconnections illustrated in FIG. 3B.

FIG. 3C illustrates a network graph of an exemplary configuration showing interconnection between nodes 301-316. Active connections are illustrated by solid lines and inactive connections are illustrated by dashed lines. According to the illustrated embodiment, three islands are shown. As used herein, the term island refers to distinct segments that are not in electrical communication. The first island includes nodes 301, 302, 305, 309, 310, 313, and 314. The second island includes nodes 303, 304, 307, 308, 311, 312, 315, and 316. Node 306 is only node on the third island. A determination of the interconnections between the islands may accomplished using a variety of techniques.

A variety of data structures may be used to represent the network graph illustrated FIG. 3C. Further, various types of algorithms may be used to analyze and manipulate the network graph to identify islands. For example, a matrix structure may be used to represent the nodes 301-316 in the network graph and the interconnections 321-345 between the nodes. In one specific embodiment, the topology of a network graph may be represented as a data class implemented according to standard IEC 61131. The 61131 standard may be used by programmable controllers and other IEDs and/or systems associated with an electric power distribution system.

To assess the topology of an electric power distribution system, a system may iteratively traverse each node to determine which nodes can or cannot be reached from a given node, and/or may determine the number of different isolated segments that exist containing more than a single node. For example, beginning at node 301, such a system may determine that each of nodes 302 and 305 may be reach using interconnections 321 and 325, respectively. Further, such a system may determine that node 306 cannot be reach using interconnection 326. Based on this exploration of node 301, the system may conclude that nodes 301, 302, and 305 are all associated with the same island.

Figure 4:
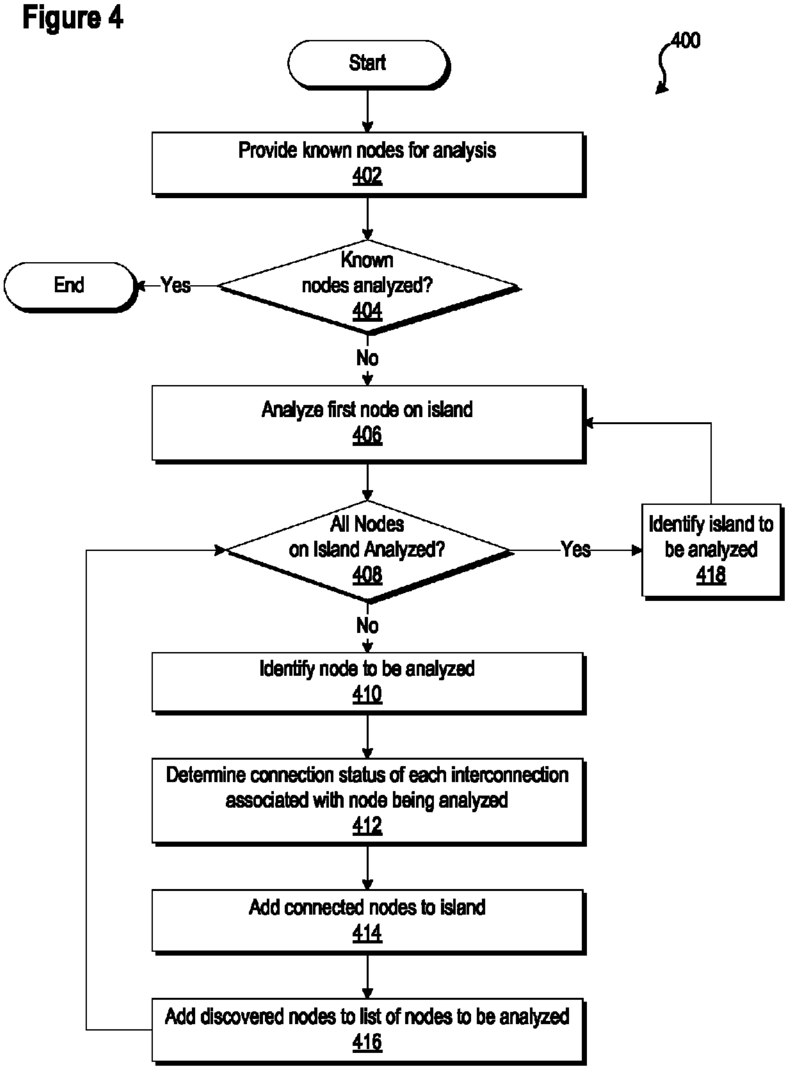
FIG. 4 illustrates a method for identifying nodes associated with a plurality of islands in an electrical generation and distribution system consistent with embodiments of the present disclosure.

FIG. 4 illustrates a method 400 for identifying nodes associated with a plurality of islands in an electrical generation and distribution system consistent with embodiments of the present disclosure. Method 400 may begin at 402 at which known nodes for analysis may be provided. At 404, it may be determined whether known nodes are analyzed. If all known nodes are analyzed, method 400 may end. If not, method 400 may progress to 406, at which a first node on an island may be analyzed.

At 408, it may be determined whether all nodes on the island have been analyzed. If so, a new island to be analyzed may be identified at 418. If all nodes on the island have not been analyzed, at 410, a node to be analyzed may be identified. At 412, the connection status of each interconnection associated with the node being analyzed may be determined. At 414, the connected nodes may be added to the island being analyzed. Further, any additional nodes that are discovered may be added to a list of nodes to be analyzed at 416.

Using the approaches described in connection with FIGS. 3A-3C and FIG. 4, a control system monitoring an electric power generation and distribution system may determine a system topology. More specifically, the system may determine which sources are connected to which loads. With information regarding the connection of specific sources to specific loads, estimation of the capacity of the electrical sources may allow for improved implementation of load shedding schemes and other control strategies to balance generation and demand. For example, where a generator supplying a plurality of loads has available additional capability, a control system may increase the generator output prior to shedding loads.

Figure 5A:
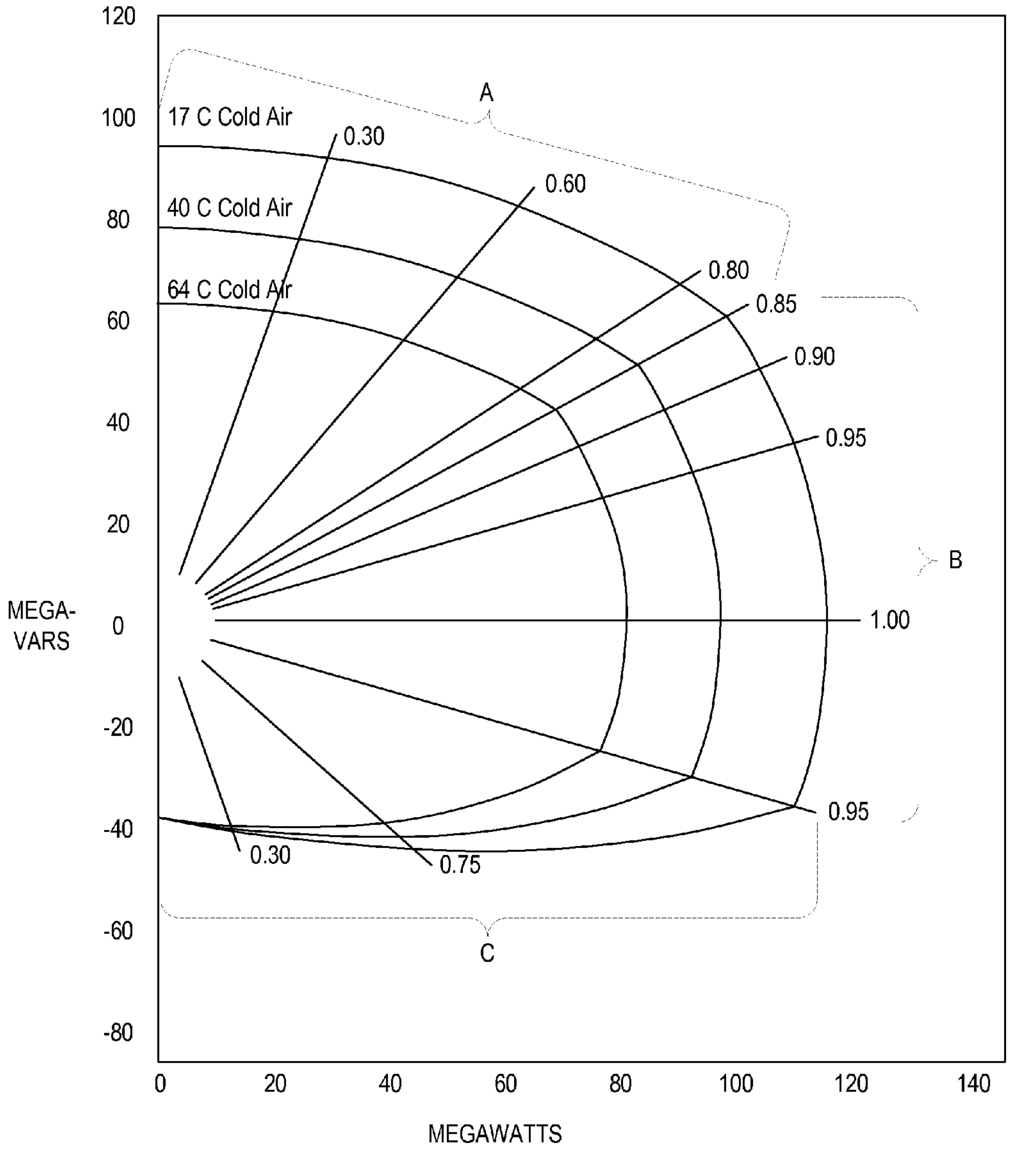
FIG. 5A illustrates an example of a generator capability curve showing power output at a plurality of power factors and at three specific temperatures consistent with embodiments of the present disclosure.

FIG. 5A illustrates a generator capability curve showing power output at a plurality of power factors and at three specific temperatures consistent with embodiments of the present disclosure. As described above, information provided by generator manufacturers commonly includes three different temperatures and the power output, as a function of power factor, of the generator operating at the specific temperatures based on empirical measurements. In the particular capability curve shown in FIG. 5A, the temperatures are 17° C., 40° C., and 64° C. The output of the generator varies significantly based on the temperature of the cooling gas. Further, the output varies as a function of the power factor, which is designated by the plurality of radially extending lines labeled between 0.30 and 1.0.

FIG. 5A illustrates an ANSI reactive power capability curve; however the systems and methods disclosed herein are applicable to a variety of types of generators and capability curves. For example, the shape capability curves may vary based upon the design of the generator and varying manufacturers may provide different types of data for their respective products.

In the ANSI reactive power capability curve shown in FIG. 5A, three sections are shown, which are labeled A, B, and C. Segment B, is an approximately circular segment centered at the origin, and represents the thermal constraints of the armature winding limit. This circle's radius specifies the MVA rating of a machine, which is the vector sum of the real and reactive power. Segment A shows that, at larger power factors, the armature winding limit no longer dominates the thermal limitations of the generator. Instead, the eddies in the end-windings around the rotor become too strong when the field winding is over-excited, and these magnetic eddy currents create excess heat in the rotor-end windings, limiting the output capability of the generator.

Segment C, represents the fact that large amounts of power cannot be exported if the field winding is under-excited. The more the field winding voltage is reduced, and thus the more MVARs are absorbed by the generator, the less real power can be provided. The torque contribution to an electric power generation and distribution system may not be coupled by the weak magnetic field in the air gap.

While the generator capability curve shown in FIG. 5A may be useful for determining the generator's capability at the specifically illustrated temperatures, the capability curve may be limited to providing data for three operating temperatures. In the event that a system is operating at a temperature distinct the three provided operating temperature (e.g., 50° C.), the output of the generator is less certain.

Figure 5B:
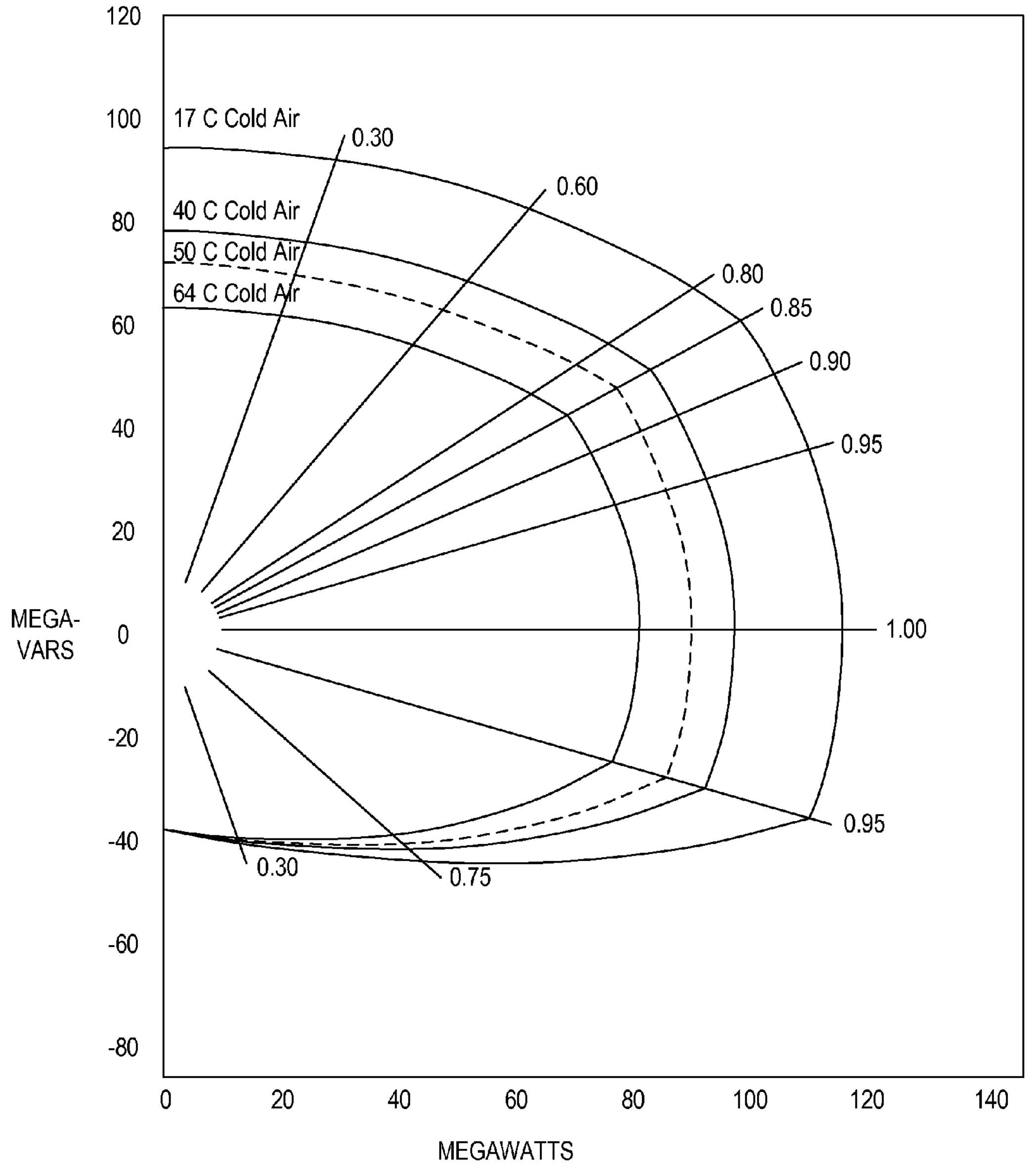
FIG. 5B illustrates the generator capability curve of FIG. 5A showing an estimated generator capacity at a temperature that is distinct from the temperatures shown in FIG. 5A.

FIG. 5B illustrates the generator capability curve of FIG. 5A showing an estimated generator capacity at a temperature that is distinct from the temperatures shown in FIG. 5A (i.e., 50° C.). The estimated generator capacity at 50° C. may be based on a generator capability model. According to various embodiments, known data relating to generator capacity (e.g., the data illustrated in FIG. 5A) may be used as a data set from which the generator capability model may be derived. Accordingly to some embodiments, the information provided by the generator manufacturer may be used in order to bound the permissible operating region of the generator and constrain the generator capability model. Information regarding generator capability may be used in connection with control decisions, such as load shedding, generation capacity, and the like.

In one embodiment, the generator capability model may develop a polynomial representing an output of the generator as a function of a measured derate variable (e.g., a temperature, a pressure, etc.). Using the polynomial representation, an arbitrary value may be entered for the derate value, and the curve shape at that particular measured value can be determined.

According to some embodiments, the generator capability model comprises a piecewise function including three components relating to the different segments described above. A curve fit analysis may be performed on each of the three components to generate a mathematical model representing an expected response of the generator at a temperature that is distinct from the temperatures illustrated in FIG. 5A. In this way, any de-rate value measured between the manufacturer supplied values may be represented using the piecewise functions graphed at the appropriate de-rate value.

Figure 6:
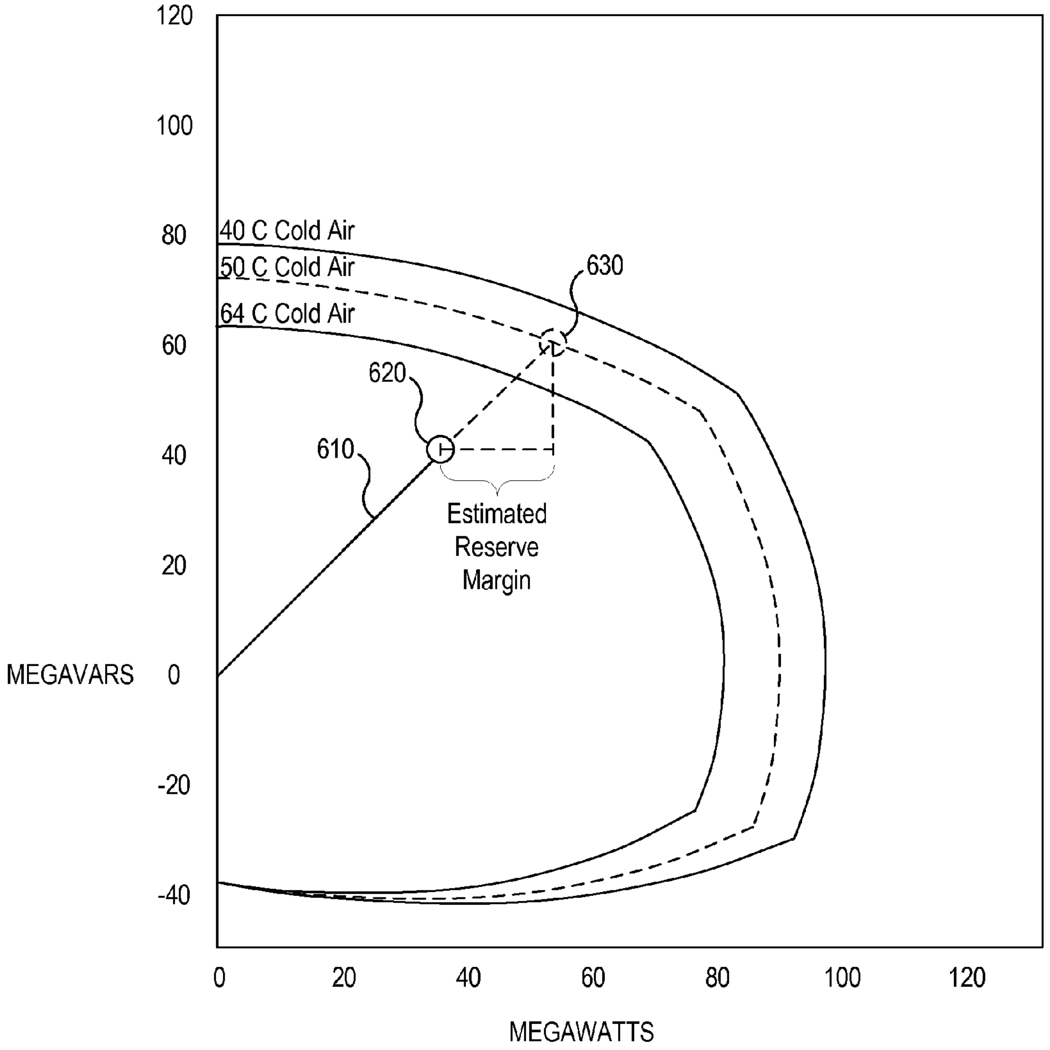
FIG. 6 graphically illustrates an estimate of a reserve margin in relation to an operating vector consistent with embodiments of the present disclosure.

FIG. 6 graphically illustrates an estimate of a reserve margin in relation to an operating vector consistent with embodiments of the present disclosure. As the term is used herein, the reserve margin is an amount of additional power that can be provided by a generator, given a present operating point of the generator. According to the illustrated example shown in FIG. 6, the increase in the power output may be assumed to occur at a constant power factor. This approach may be used to estimate a reserve margin based on a derate variable (i.e., temperature of the cooling gas) provided by a data set provided by a manufacturer of the generator. Alternatively, as shown, this approach may also be used to estimate a reserve margin based on a temperature that is distinct from the data provided by the manufacturer.

The estimated reserve margin may be determined by projecting an operating vector 610 operating from a current operating point 620 to a projected operating point 630. The estimated reserve margin may be the difference between the current operating point 620 and the projected operating point 630 along the x-axis (i.e., the axis showing real power output of the generator).

An estimate of an available reserve margin may further be refined using other constraints that may be associated with a generator. Such constraints may include, for example, as turbine capacity, emission requirements, the availability of increased mechanical force, etc. An analysis relating to one or more of other potentially limiting constraints may be performed, and the most constraining limiting factor may be selected as the reserve margin. For example, an estimated reserve margin based on a generator capability model may indicate a reserve margin of 40 MW; however, the turbine driving the generator is only capable of providing an additional 10 MW. The lower of these two limiters (i.e., 10 MW) may be selected as the reserve margin of the unit.

Figure 7:
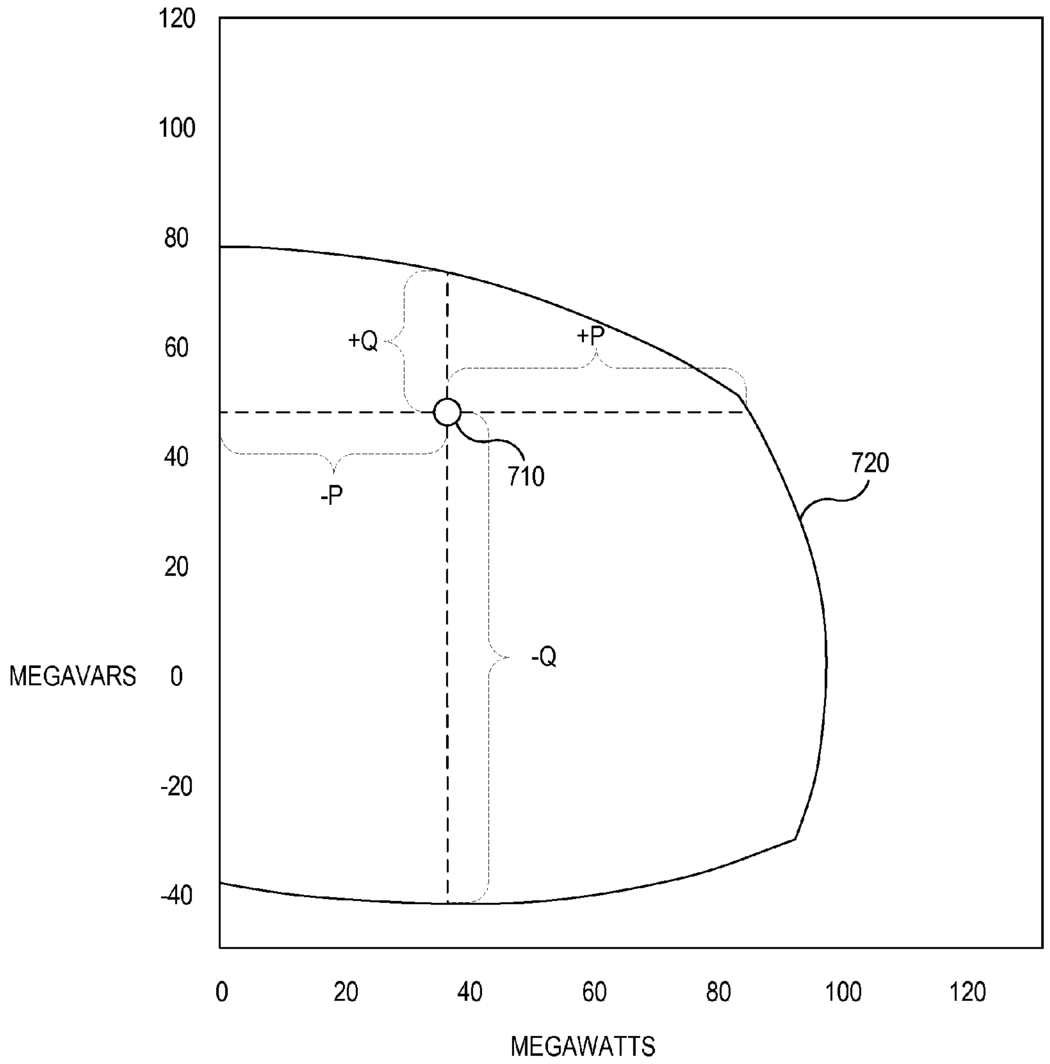
FIG. 7 graphically illustrates a reactive maneuvering margin and a real maneuvering margin consistent with embodiments of the present disclosure.

FIG. 7 graphically illustrates a reactive maneuvering margin and a real maneuvering margin consistent with embodiments of the present disclosure. The maneuvering margin, for the purposes of this document, is the difference between the measured operating point 710, and operating limit of the generator 720, if traveling along a single axis. A control system may manipulate the VAR output of the generator to influence the voltage or frequency of the generator output. The manipulation of the VAR output may be decoupled from the real power output of the generator. Further, the control system may manipulate the real power output to influence the voltage or frequency of the generator output without significantly affecting the VAR output. The control system may treat the maneuvering margins on the real axis and the maneuvering margins on the reactive axis as two separate limiters.

Figure 8:
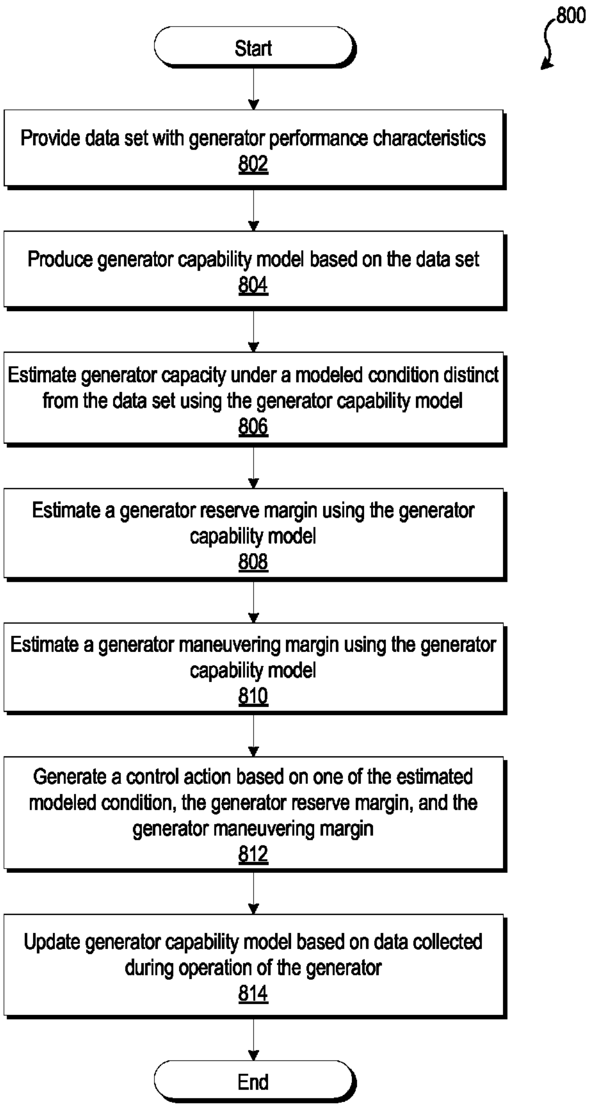
FIG. 8 illustrates a flow chart of a method for producing a generator capability model consistent with embodiments of the present disclosure.

FIG. 8 illustrates a flow chart of a method 800 for producing a generator capability model consistent with embodiments of the present disclosure. At 802, a data set may be provided that includes generator performance characteristics. According to certain embodiments, the performance characteristics may include a plurality of generator capability curves that represent a maximum continuous output of a generator at a variety of temperatures. In other embodiments, the performance characteristics may include information regarding the performance of the generator based on pressures in the air gap of the generator.

At 804, a generator capability model may be produced based on the data set. The generator capability model may include a mathematical representation of the generator output as a function of a derate variable, a power factor, and/or other criteria. Further, the generator capability model may include other potential limitations on the output of the generator (e.g., turbine capacity, emission requirements, etc.). The generator capability model may be produced using a variety of modeling and simulation techniques in order to accurately model the data set and other available information regarding the performance of the generator.

At 806, an estimate of a generator capacity under a modeled condition may be made. The modeled condition may be distinct from the data set. For example, if the data set comprises information regarding the generator output at a plurality of specific temperatures, the modeled condition may represent a temperature that is not represented in the data set. Further, estimates of a reserve margin and a maneuvering margin may be made at 808 and 810, respectively, using the generator capability model.

At 812 a control action may be generated based on one of the estimated generator capacity, the estimated generator reserve margin, and the estimated generator maneuvering margin. Such control actions may include, for example, load shedding, increasing power generation, manipulating a reactive power output, manipulating an active power output, etc.

At 814, the generator capability model may be updated based on data collected during operation of the generator. In other words, information obtained during the operation of the generator may be used to update and refine the generator capability model. For example, the generator may be operated at a plurality of operating conditions. Information regarding the performance of the generator may be used to update the generator capability model to more accurately model and predict the performance of the generator.

Figure 9:
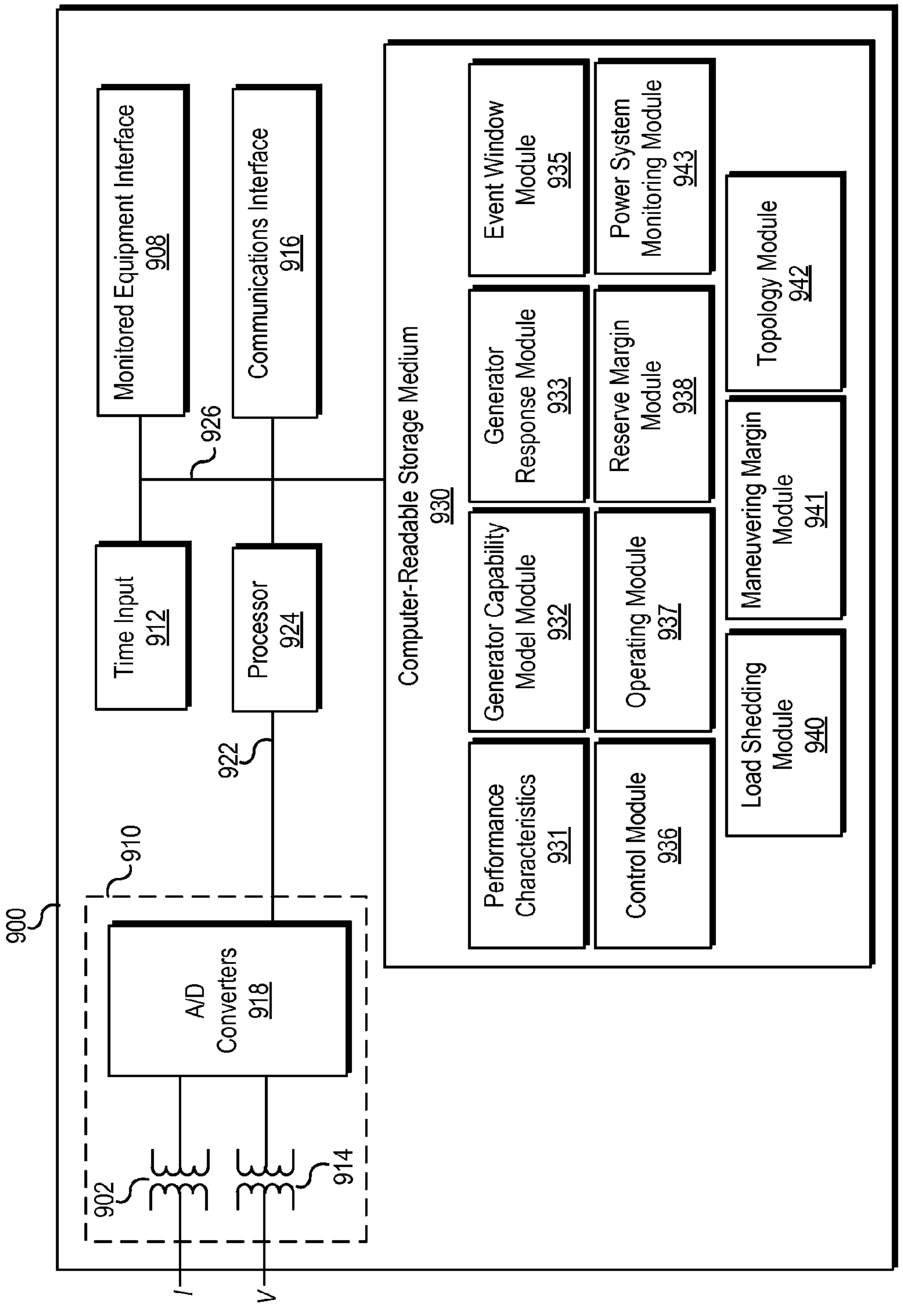
FIG. 9 illustrates a functional block diagram of a system operable to manage a power system consistent with the present disclosure.

FIG. 9 illustrates a functional block diagram of a system 900 operable to manage a power system consistent with the present disclosure. In certain embodiments, the system 900 may comprise an IED system configured to, among other things, detect faults using traveling waves and estimate a location of the fault. System 900 may be implemented in an IED using hardware, software, firmware, and/or any combination thereof. Moreover, certain components or functions described herein may be associated with other devices or performed by other devices. The specifically illustrated configuration is merely representative of one embodiment consistent with the present disclosure.

IED 900 includes a communications interface 916 configured to communicate with other IEDs and/or system devices. In certain embodiments, the communications interface 916 may facilitate direct communication with another IED or communicate with another IED over a communications network. Communications interface 916 may facilitate communications with multiple IEDs. IED 900 may further include a time input 912, which may be used to receive a time signal (e.g., a common time reference) allowing IED 900 to apply a time-stamp to the acquired samples. In certain embodiments, a common time reference may be received via communications interface 916, and accordingly, a separate time input may not be required for time-stamping and/or synchronization operations. One such embodiment may employ the IEEE 1588 protocol. A monitored equipment interface 908 may be configured to receive status information from, and issue control instructions to, a piece of monitored equipment (such as a circuit breaker, conductor, transformer, or the like).

Processor 924 may be configured to process communications received via communications interface 916, time input 912, and/or monitored equipment interface 908. Processor 924 may operate using any number of processing rates and architectures. Processor 924 may be configured to perform various algorithms and calculations described herein. Processor 924 may be embodied as a general purpose integrated circuit, an application specific integrated circuit, a field-programmable gate array, and/or any other suitable programmable logic device.

In certain embodiments, IED 900 may include a sensor component 910. In the illustrated embodiment, sensor component 910 is configured to gather data directly from a conductor (not shown) and may use, for example, transformers 902 and 914 and A/D converters 918 that may sample and/or digitize filtered waveforms to form corresponding digitized current and voltage signals provided to data bus 922. A/D converters 918 may include a single A/D converter or separate A/D converters for each incoming signal. A current signal may include separate current signals from each phase of a three-phase electric power system. A/D converters 918 may be connected to processor 924 by way of data bus 922, through which digitized representations of current and voltage signals may be transmitted to processor 924. In various embodiments, the digitized current and voltage signals may be used to calculate the location of a fault on an electric power line as described herein.

Computer-readable storage medium 930 may be the repository of various software modules configured to perform any of the methods described herein. A data bus 942 may link monitored equipment interface 908, time input 912, communications interface 916, and computer-readable storage mediums 926 and 930 to processor 924.

Computer-readable storage medium 930 may further comprise a plurality of performance characteristics 931 of a source. According to certain embodiments, the performance characteristics 931 may include a plurality of generator capability curves that represent a maximum continuous output of a generator at a variety of temperatures. In other embodiments, the performance characteristics 931 may include information regarding the performance of the generator based on pressures in the air gap of the generator.

A generator capability model module 932 may be configured to produce a generator capability model that represents the generator output as a function of a derate variable, a power factor, and/or other criteria. Further, the generator capability model may include other potential limitations on the output of the generator (e.g., turbine capacity, emission requirements, etc.). The generator capability model module 932 may be configured to produce a generator capability model using a variety of modeling and simulation techniques in order to accurately model the performance characteristics 931 and other available information regarding the performance of the generator.

A generator response module 933, a reserve margin module 938, and a maneuvering margin module 941 may be configured to produce estimates of various performance parameters based on the generator capability model. The estimates produced by generator response module 933, reserve margin module 938, and maneuvering margin module 941 may be used by control module 936 to generate and/or implement a suitable control action. For example, the control action may include increasing an output of the generator to an operating point below the estimated generator capacity at the modeled condition, shedding a load based upon a determination the reserve margin is below a threshold, adjusting a reactive power output within the reactive maneuvering margin, and adjusting a real power output within the real maneuvering margin to influence either a voltage output and a frequency output of the generator.

A load shedding module 940 may be configured to identify circumstances in which shedding of load is appropriate to maintain a balance between electrical generation and demand. According to some embodiments, load shedding module 940 may operate in conjunction with event window module 935 to implement method 200, as illustrated in FIG. 2. As described in connection with FIG. 2, detection of the conditions in which load shedding is appropriate may be based upon detection of specific conditions within established windows or periods of time. According to other embodiments, load shedding module 940 may implement other algorithms for identify nodes associated with islands.

An operating module 937 may be configured to collected data during operation of the generator and to update the generator capability model based on data collected by the operating module 937. Data collected by the operating module 937 may be used to tune or refine the generator capability model in order to more accurately predict the response of the generator to various operating conditions.

A topology module 942 may be configured to determine a topology of an electrical power generation and distribution system. Further, power system monitoring module 943 may operate in conjunction with topology module 942 to identify events in the electrical power generation and distribution system and determine changes in the topology of the system. Topology module 942 may be configured to identify nodes in the electrical power generation and distribution system associated with islands. According to some embodiments, topology module 942 may be configured to implement method 400, as illustrated in FIG. 4. According to other embodiments, topology module 942 may implement other algorithms for identify nodes associated with islands.

Figure 10:
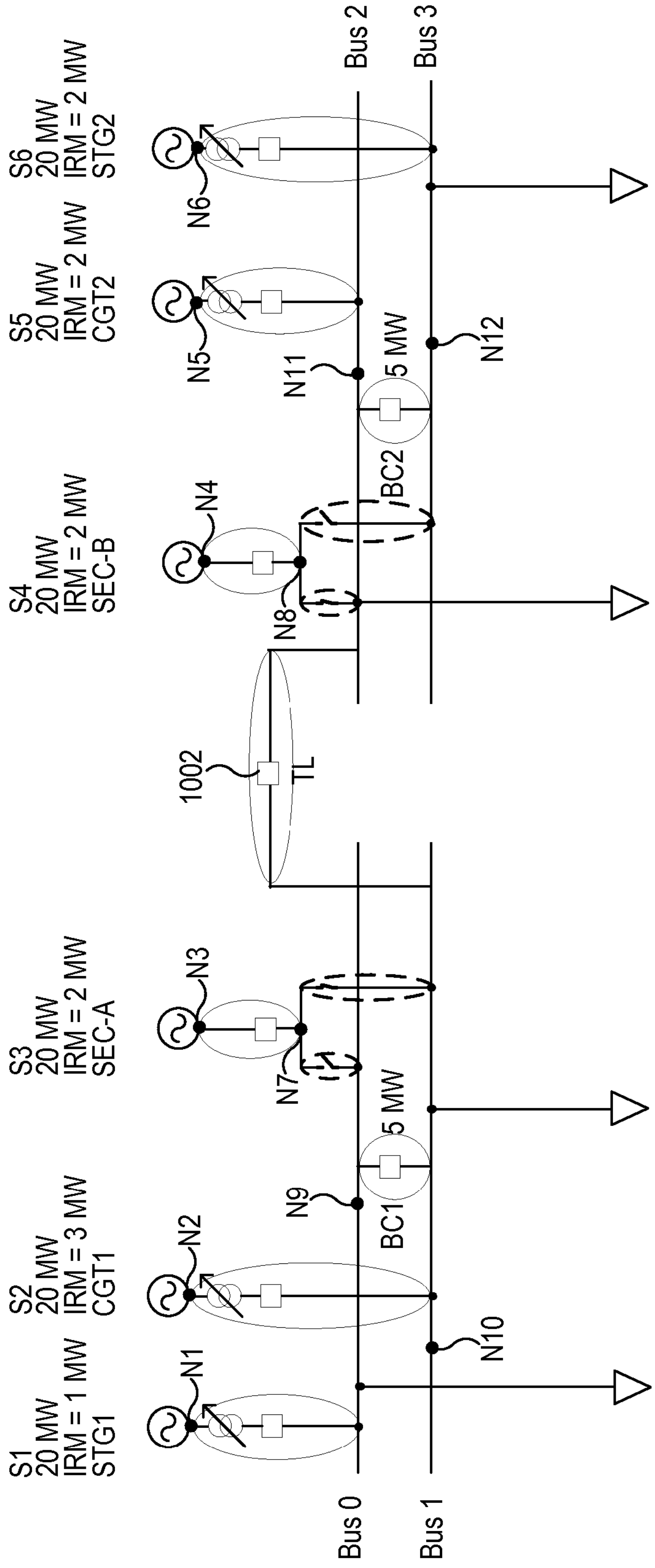
FIG. 10 illustrates a one line diagram of an electrical power distribution system and illustrates an exemplary method for calculating an amount of load to shed based upon the detection of a specified contingency consistent with embodiments of the present disclosure.

FIG. 10 illustrates a one line diagram of an electrical power distribution system 1000 and illustrates an exemplary method for calculating an amount of load to shed based upon the detection of a specified contingency consistent with embodiments of the present disclosure. The symbols shown in FIG. 10 are illustrated in the legend shown in FIG. 1B. As previously described, each source in system 1000 has certain limits that must be observed in order to maintain the stability of system 1000. An incremental reserve margin is the difference between the current operating point and a maximum output that can be expected. Each source may have multiple limiters attached to it, and will use the lowest limit as the incremental reserve margin shown IRM for the below calculations. These limits are characterized as either capacity limits or reserve margin limits.

Topology changes may be assessed to maintain stability of system 1000 by maintaining a sufficient incremental reserve margin. According to some embodiments, a control system may identify certain nodes as a "super-node." A super-node will remain connected if all the topology links associated with topology contingencies are opened. For example, in the particular topology contingency illustrated in FIG. 10, there are 4 super-nodes, which are: (1) N9, (2) N10 and N7, (3) N11 and N8, and (4) N12. It may be noted that the links between N7-N18 and N8-N11 are not associated with contingencies. In another example that is not specifically illustrated, if in another contingency the switch connecting N8 and N12 were closed, then there would only be 3 super-nodes, which are: (1) N9, (2) N10 and N7, and (3) N11, N8, and N12.

The allocation of Topology Nodes to super-Nodes will be calculated regularly at a slow-speed interval as long as the system is not in "state-estimation mode". As soon as the Application Library enters "state-estimation mode" the super-Nodes are assumed to be static, which allows direct comparisons of the previous super-node state to the present state, and a resulting "required to shed" amount calculated.

The following amounts are calculated at slow-speed as well each time the super-nodes are updated.

1. Total amount of real power from Sources connected to the super-node.

2. Total amount of load supplied by the super-node is calculated by starting with the total amount of real power calculated in step one above and subtracting the total out-flow across contingency objects that do not connect a source. For each of the super-nodes on the slow-speed thread in the example, the following calculations may be performed:

i) N9

(1) Source total=20=20 MW (2) Electrical load total=20−(−5)=25 MW ii) N10, N7

(1) Source total=20+20=40 MW (2) Electrical load total=40−(−10)−5=45 MW iii) N11, N8

(1) Source total=20+20=40 MW (2) Electrical load total=40−10−5=25 MW iv) N12

(1) Source total=20=20 MW (2) Electrical load total=20−(−5)=25 MW

Continuing the example, a circumstance may arise in which breaker 1002 is opened, resulting in 10 MW of power lost to Node N10. Assuming the trigger was successfully confirmed, the island containing Node N10 must now shed sufficient load to maintain the stability of system 1000. The amount of load to be shed may be calculated y determining a source total and incremental reserve margin for each super node. In one example, the following values may be determined:

i) N9

(1) Source total=20=20 MW (2) IRM total=1=1 MW ii) N10, N7

(1) Source total=20+20=40 MW (2) IRM total=3+2=5 MW iii) N11, N8

(1) Source total=20+20=40 MW (2) IRM total=2+2=4 MW iv) N12

(1) Source total=20=20 MW (2) IRM total=2=2 MW

The first node in each super-node may be assigned to an electrical island. In the present example, super-nodes exist on two separate electrical islands. These are designated A and B for this example. Island A contains super nodes N9 and N10, N7, and island B contains super nodes N11, N8 and N12. The following calculations may then be performed, based on the the electrical load allocation, to determine the amount of load to be shed.

$$[\text{Amount of load to shed Island } A] = \sum[\text{Load of SuperNodes on Island A FROM LAST STATE}] - \sum[\text{SuperNode Sources on Island } A] - \sum[IRM \text{ of SuperNodes on Island } A] \quad \text{Eq. 1}$$

According specific example analyzed here Eq. 1 may be determined, using Eq. 2.

$$[\text{Amount of load to shed Island } A] = ((25+45)-(20+40)-(1+5))\text{ MW} = 4\text{ MW} \quad \text{Eq. 2}$$

For illustrative purposes, assume that the load-selection algorithm resulted in a slight over-shed, and 3 MW were removed from Super-Node "N9", and 3 MW were removed from Super-Node "N10, N7". This means that at the end of the scan, those amounts will be removed from the Electrical load allocation on those Super-Nodes, resulting in the Super-Node load allocation equal to:

i) N9 Electrical load total=25−3=22 MW ii) N10, N7 Electrical load total=45−3=42 MW iii) N11, N8 Electrical load total=25 MW iv) N12 Electrical load total=25 W Additionally, all Source IRM allocations may be reduced by the proportion of IRM that they contributed to the electrical island. Island A had to shed 4 MW to use all the IRM, but shed 6 MW instead, meaning that there is still: 6 MW-4 MW=2 MW of IRM remaining on Island A. The last time the IRM was calculated, the following breakdown of IRM contributions by Source was noted:

Source S1 contributed 1/6 IRM to the island.

Source S2 contributed 3/6 IRM to the island.

Source S3 contributed 2/6 IRM to the island.

The remaining IRM is evenly re-distributed to the Sources on the electrical island if load shedding occurred, resulting in the following:

Source S1 IRM=0.333 MW.

Source S2 IRM=1 MW

Source S3 IRM=0.667 MW

The difference of the allocation and previous supplied power per source is added to the metered value per Source resulting in:

Source S1 power=20+(1−0.333)=20.667 MW

Source S2 power=20+(3−1)=22.000 MW

Source S3 power=20+(2−0.667) MW=21.333 MW

The Source total assumed for an electrical island also must not exceed the load total, so electrical Island B must have its Source amounts reduced in a similar fashion. Currently, the summation of sources vs. loads on electrical Island B is:

Total Source to Island B: 20+40=60 MW

Total Electrical load to Island B: 25+25=50 MW

The fact that more Source power is ascribed to the island than load implies that the actual Source amount supplied should be reduced. This may be done based on the present power contribution of each Source. Since all Sources are currently supplying 20 MW, the power assumed to be provided from each Source will be evenly reduced by 10 MW/3units=3.333 MW Source S4 power=20−3.333=16.667 MW Source S5 power=20−3.333=16.667 MW Source S6 power=20−3.333=16.667 MW While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electrical system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A system for contingency-based load shedding in an electrical power distribution system, comprising:
- a data bus;
- a processor in communication with the data bus; and
- a non-transitory computer readable storage medium in communication with the data bus, the non-transitory computer readable storage medium storing information comprising:
  - a data set comprising a priority list associating at least one priority with a plurality of loads connected to an electrical power distribution system;
  - a power system monitoring module executable on the processor and configured to monitor the electrical power distribution system and detect a first contingency trigger associated with a first contingency;
  - an event window module executable on the processor and configured to identify, within a contingency window following the first contingency:
    - a first change in topology of the electric power distribution system specified by the first contingency,
    - a second change in topology affecting at least one of a plurality of sources in electrical communication with the plurality of loads, and
    - a contingency event associated with the first contingency; and
  - a load shedding module executable on the processor and configured to selectively shed at least one of the plurality of loads based on the priority list based upon the identification of the first change in topology, the second change in topology, and the contingency event each occurring within the contingency window.

2. The system of claim 1, wherein the event window module is configured to monitor a plurality of status indicators associated with a plurality of electrical couplers in the electric power distribution system, and one of the first change in topology and the second change in topology corresponds to a change associated with at least one of the plurality of electrical couplers.

3. The system of claim 1, wherein the load shedding module is further configured to selectively shed loads based on the priority list until a stabilizing condition is satisfied.

4. The system of claim 3, wherein the load shedding module is further configured to implement a delay period following the shedding of each load prior to evaluation of the stabilizing condition.

5. The system of claim 1, wherein the first contingency trigger comprises a reserve margin falling below a specified threshold.

6. The system of claim 5, wherein the power system monitoring module is further configured to selectively evaluate an incremental reserve margin at a plurality of points throughout the electric power distribution system and to establish the first contingency trigger based on one of the incremental reserve margin at any of the plurality of points.

7. The system of claim 1, wherein the first change in topology, the second change in topology, and the contingency event rely on independently derived information relating to the electric power distribution system.

8. The system of claim 1, wherein the second change in topology results in at least one source of the plurality of sources being associated with a different electrical island following the second change in topology.

9. The system of claim 1, wherein the priority list comprises a priority for each of a plurality of sheddable loads.

10. The system of claim 1, wherein the power system monitoring module is further configured to identify a second contingency trigger associated with a multiple contingency event, and the event window module is configured to identify any of a plurality of contingency events associated with the multiple contingency event.

11. A method for contingency-based load shedding in an electrical power distribution system, comprising:
- providing a data set comprising a priority list associating a priority with a plurality of loads connected to the electrical power distribution system;
- monitoring the electrical power distribution system and detecting a first contingency trigger associated with a first contingency;
- identifying, within a contingency window following the first contingency:
  - a first change in topology of the electric power distribution system specified by the first contingency
  - a second change in topology affecting at least one of a plurality of sources in electrical communication with the plurality of loads; and
  - a contingency event associated with the first contingency; and
- shedding at least one of the plurality of loads based on a priority list based upon the identification of the first change in topology, the second change in topology, and the contingency event each occurring within the contingency window.

12. The method of claim 11, further comprising:
- identifying one of the first change in topology and the second change in topology by monitoring a plurality of status indicators associated with a plurality of electrical couplers in the electric power distribution system, and the first change in topology corresponds to a change associated with at least one of the plurality of electrical couplers.

13. The method of claim 11, further comprising:
- shedding loads based on the priority list until a stabilizing condition is satisfied.

14. The method of claim 13, further comprising:
- implementing a delay period following the shedding of each load prior to evaluating the stabilizing condition.

15. The method of claim 11, wherein the first contingency trigger comprises one of a reserve margin falling below a specified threshold.

16. The method of claim 15, further comprising:
- evaluating a reserve margin at a plurality of points throughout the electric power distribution system; and establishing the first contingency trigger based on one of the reserve margin at any of the plurality of points.

17. The method of claim 11, wherein the first change in topology, the second change in topology, and the contingency event rely on independently derived information relating to the electric power distribution system.

18. The method of claim 11, wherein the second change in topology results in at least one source of the plurality of sources being associated with a different electrical island following the second change in topology.

19. The method of claim 11, wherein the priority list comprises a priority for each of a plurality of sheddable loads.

20. The method of claim 11, further comprising:

identifying a second contingency trigger associated with a multiple contingency event; and identifying any of a plurality of contingency events associated with the multiple contingency event.

* * * * *